(12) United States Patent
Kaneko

(10) Patent No.: US 8,291,071 B2
(45) Date of Patent: Oct. 16, 2012

(54) MANAGEMENT SERVER, MONITORING APPARATUS, AND METHOD FOR MANAGING IMAGE FORMING APPARATUS AND CONTROLLING MONITORING APPARATUS

(75) Inventor: Tsuyoshi Kaneko, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 459 days.

(21) Appl. No.: 12/693,224

(22) Filed: Jan. 25, 2010

(65) Prior Publication Data

US 2010/0198966 A1 Aug. 5, 2010

(30) Foreign Application Priority Data

Jan. 30, 2009 (JP) ................................ 2009-020151
Oct. 21, 2009 (JP) ................................ 2009-242486

(51) Int. Cl.
*G06F 15/173* (2006.01)
(52) U.S. Cl. ....................... 709/224; 709/223
(58) Field of Classification Search ................ None
See application file for complete search history.

(56) References Cited

U.S. PATENT DOCUMENTS

| | | | | |
|---|---|---|---|---|
| 7,149,792 B1* | 12/2006 | Hansen et al. | ................ | 709/220 |
| 7,502,841 B2* | 3/2009 | Small et al. | ................... | 709/223 |
| 7,779,111 B2* | 8/2010 | Shiraiwa et al. | .............. | 709/223 |
| 2005/0281566 A1* | 12/2005 | Kaneko | ............................. | 399/8 |
| 2007/0011446 A1* | 1/2007 | Kato et al. | .................... | 713/150 |
| 2007/0288623 A1* | 12/2007 | Kato et al. | .................... | 709/223 |
| 2008/0126530 A1* | 5/2008 | Motoyama et al. | ........... | 709/224 |

FOREIGN PATENT DOCUMENTS

JP 2008-079003 A 4/2008

* cited by examiner

*Primary Examiner* — Peling Shaw
(74) *Attorney, Agent, or Firm* — Canon USA, Inc., IP Division

(57) ABSTRACT

A management server receives identification information including an IP address, MAC address, and product number of an image forming apparatus together with operation information thereof such as counter information via a network. Then, the management server determines whether the received identification information coincides with registration information. When the management server determines that the received identification information coincides with the registration information, the management server stores the operation information in association with a registered image forming apparatus.

12 Claims, 12 Drawing Sheets

FIG.4

| CUSTOMER ID | S/N | IP ADDRESS | MAC ADDRESS | COUNTER INFORMATION | VENDOR INFORMATION |
|---|---|---|---|---|---|
| 401 | 402 | 403 | 404 | 405 | 406 |
| 00000001 | DEV0000000001 | 172.24.xxx.1 | 100000xxxxx1 | 10 | COMPANY A |
| 00000001 | DEV0000000002 | 172.24.xxx.2 | 100000xxxxx2 | 200 | COMPANY A |
| 00000001 | DEV0000000003 | 172.24.xxx.3 | 100000xxxxx3 | 150 | COMPANY A |
| 00000001 | DEV0000000004 | 172.24.xxx.4 | 100000xxxxx4 | 170 | COMPANY A |
| 00000005 | DEV0000000003 | 100.10.xxx.5 | 100000xxxxx5 | 1200 | COMPANY B |

FIG.5

| MAC ADDRESS (501) | VENDOR NAME (502) |
|---|---|
| 00C085xxxxxx | CXXXN |
| 000074xxxxxx | RXXXH |
| 000048xxxxxx | EXXXN |
| 080037xxxxxx | XXXXX |
| 000000xxxxxx | COMPANY A |
| 500000xxxxxx | COMPANY B |

From: emintev@emtest.cxxxn-europe.com
To: em.its.support@cxxxn-europe.com
Subject: [Maintenance] Customer Name: CUST - Customer ID: ABX001 - Alarm Notification - De The MAC address of one or more customer devices has been modified.
For details, see the following URL:
https://test.ugwportal.net/w03/SYMain1.jspxxxxx

702

Reference number: 31014341430
Receive time from Monitoring Device: 15/04/08 09:52(+00:00)
Customer Name: CUST
Customer ID: ABX001
Monitoring Device ID: ABX0000020603

Device ID: CENVAMSPR155

Alarm information 1
Occurrence time: 15/04/08 09:52
Alarm code: 040011
Description: Alarm for 1st cassette right deck retry failure

MANAGEMENT SERVER, MONITORING APPARATUS, AND METHOD FOR MANAGING IMAGE FORMING APPARATUS AND CONTROLLING MONITORING APPARATUS

BACKGROUND OF THE INVENTION

1. Field of the Invention

The present invention relates to a system which manages operation information of image forming apparatuses.

2. Description of the Related Art

A management system in which a management server manages image forming apparatuses is discussed in Japanese Patent Application Laid-Open No. 2008-079003. In the management system, a monitoring apparatus interfacing between image forming apparatuses and the management server detects replacement and setup change of an image forming apparatus under monitoring. Specifically, the monitoring apparatus compares identification information (media access control (MAC) address) of image forming apparatuses under monitoring, stored in the monitoring apparatus, with identification information acquired from an image forming apparatus to detect replacement of an image forming apparatus under monitoring. Then, the monitoring apparatus deletes information about the image forming apparatus detected to have been replaced, so that the information is not transferred to the management server.

In the above-mentioned management system, when the monitoring apparatus detects replacement or setup change of an image forming apparatus under monitoring, transmission of its operation information to the management server is not performed. This means that the management server cannot manage necessary information for, for example, accounting processing based on the use of the image forming apparatus.

In this case, the management server may appropriately manage operation information based on a serial number (hereinafter referred to as S/N) of image forming apparatuses. However, even if the management server manages operation information based on the S/N, it is not guaranteed that the S/N is unique for each apparatus since each vendor may use the same S/N for image forming apparatuses from different vendors.

Further, for example, even if the management server manages operation information based on the media access control (MAC) address, replacing a network interface card (NIC) itself having a MAC address setting makes it difficult to appropriately manage operation information. Therefore, there is demand for such a mechanism that the management server flexibly manages operation information in a consistent way even when an image forming apparatus is replaced or moved or when a NIC is replaced.

SUMMARY OF THE INVENTION

The present invention is directed to a method for managing appropriate operation information of an image forming apparatus in consideration of its installation conditions based on information acquired from the image forming apparatus.

According to an aspect of the preset invention, a management server configured to manage a plurality of image forming apparatuses connected to a network includes: a storage unit; a management unit configured to manage an Internet Protocol (IP) address, media access control (MAC) address, and product number of an image forming apparatus under management, stored in the storage unit in an associated way, as registration information thereof; an acquisition unit configured to acquire an IP address, MAC address, and product number of an image forming apparatus together with operation information thereof via the network; a determination unit configured to determine, when the IP address and MAC address acquired by the acquisition unit are not registered in an associated way in the registration information managed by the management unit, whether the product number acquired by the acquisition unit is registered in the registration information managed by the management unit; and a storing unit configured to store, when the determination unit determines that the product number acquired by the acquisition unit is registered in the registration information managed by the management unit, the operation information acquired by the acquisition unit in the storage unit in association with an image forming apparatus specified by the registration information including the product number.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is an exemplary operation information table used by the management server.

FIG. 5 is an exemplary table held by the management server, illustrating a relation between a MAC address and vendor.

FIG. 7 illustrates an exemplary e-mail sent from the management server to a service engineer.

DESCRIPTION OF THE EMBODIMENTS

Various exemplary embodiments, features, and aspects of the invention will be described in detail below with reference to the drawings.

Figure 1:
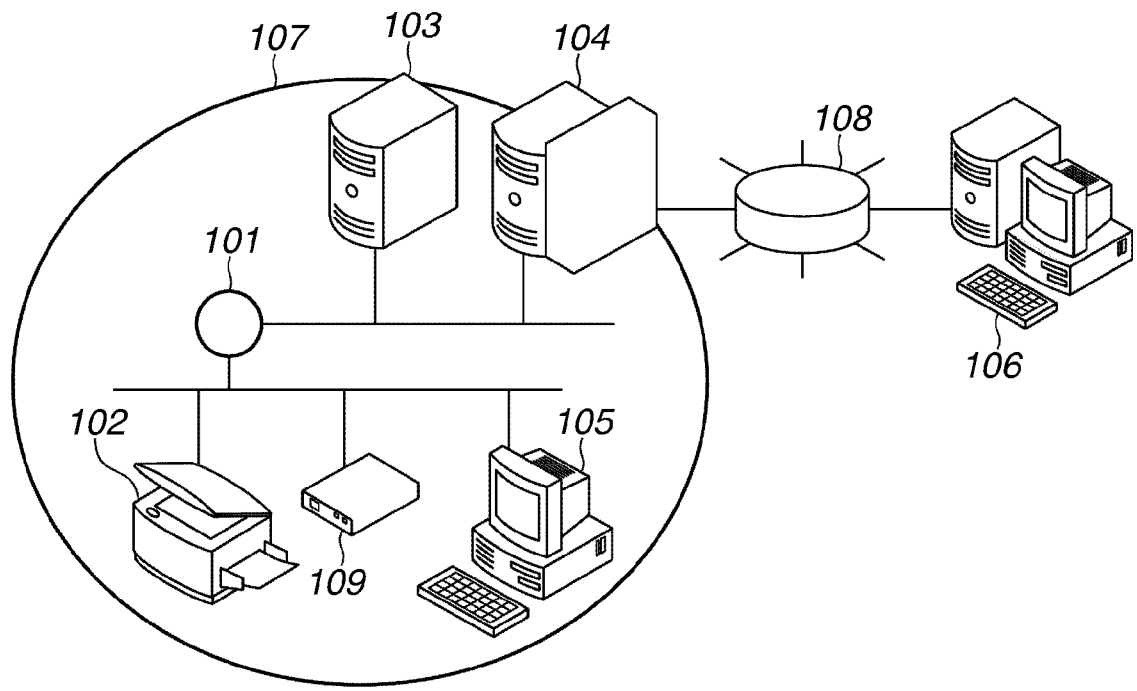
FIG. 1 illustrates a configuration of a management system according to a first exemplary embodiment of the present invention.

FIG. 1 illustrates a configuration of a management system according to a first exemplary embodiment of the present invention. In the management system, a management server 106 manages an image forming apparatus 102 connected via the Internet 108. Although one image forming apparatus is connected to a network in the present exemplary embodiment, a plurality of image forming apparatuses 102 may be connected thereto.

Referring to FIG. 1, the image forming apparatus 102, a proxy server 103, a firewall 104, a personal computer (PC) 105, and a monitoring apparatus 109 are connected to a local area network (LAN) 101. The PC 105 is a personal computer used on business by general users. The PC 105 includes hardware resources and software resources including an operating system (OS) which controls execution of applications.

Further, the image forming apparatus 102 may include facsimile and copy functions (not illustrated). The management server 106 manages the operating state of the image forming apparatus 102 in a centralized way. In an intranet 107, the image forming apparatus 102, the proxy server 103, and the firewall 104 are mutually connected via the LAN 101.

Further, the monitoring apparatus 109 is mutually connected with the image forming apparatus 102 via the LAN 101, and with the management server 106 via the Internet 108. The monitoring apparatus 109 performs communication processing based on its own communication schedule via the LAN 101 to transmit information about the image forming apparatus 102 (counter value, operation status log, and failure information) to the management server 106 via the Internet 108.

Communication protocols used in this case include the Management Information Base (MIB) via the Simple Network Management Protocol (SNMP).

Further, the image forming apparatus 102 can perform communication processing based on its own communication schedule to transmit the above-mentioned information about the image forming apparatus 102 directly to the management server 106. Although the present exemplary embodiment assumes a communication protocol such as the Hypertext Transfer Protocol (HTTP) and Hypertext Transfer Protocol Security (HTTPS), the communication protocol is not limited thereto. In the example illustrated in FIG. 1, the image forming apparatus 102 transmits data to the management server 106 via the proxy server 103 and the firewall 104 by using the protocol HTTPS.

Figure 2:
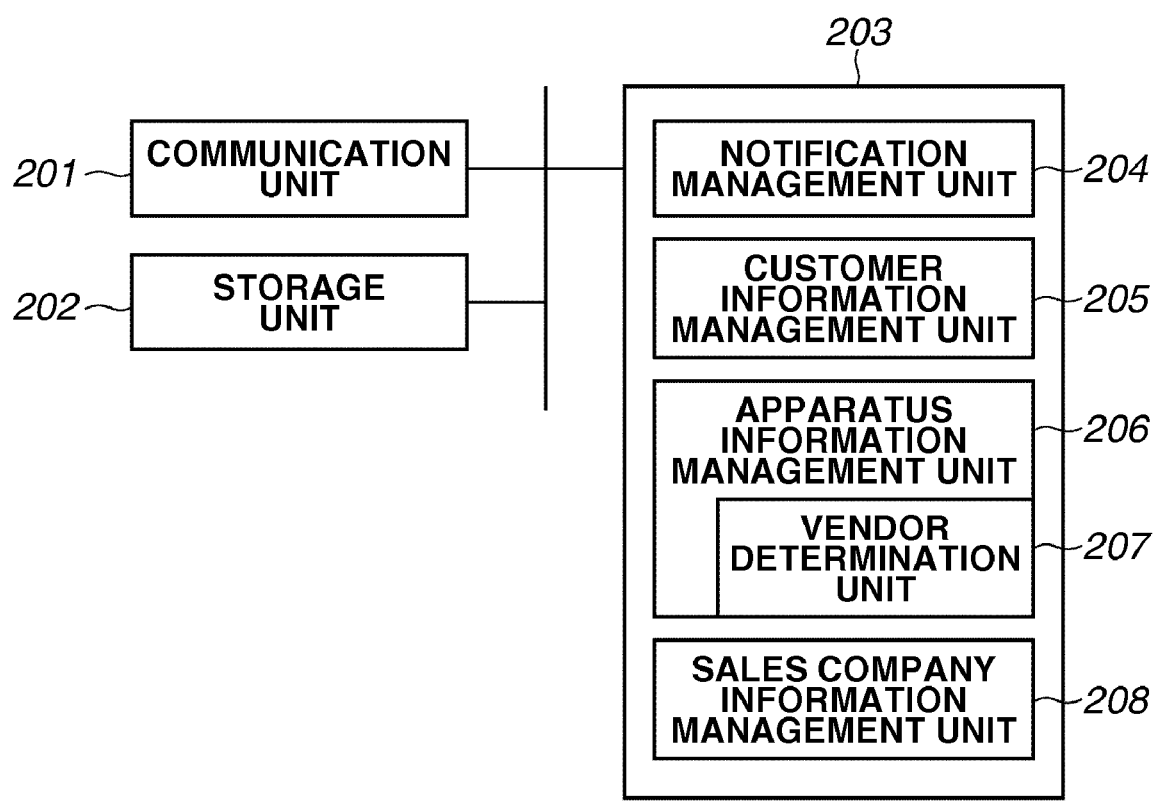
FIG. 2 is a block diagram of a configuration of modules implemented in the management server.

FIG. 2 is a block diagram of a configuration of modules for performing management functions in the management server 106 illustrated in FIG. 1. Referring to FIG. 2, the management server 106 includes a communication unit 201, a storage unit 202, and a control unit 203. The communication unit 201 communicates with the monitoring apparatus 109 and the image forming apparatus 102. The communication unit 201 receives operation information such as counter value and log and failure information such as hardware failure and jam repetition from the monitoring apparatus 109, and transmits necessary commands and information to the monitoring apparatus 109. The counter value includes, for example, the total number of sheets printed by the image forming apparatus 102.

The storage unit 202 stores operation information, sales company information, and customer information acquired from the monitoring apparatus 109. The control unit 203 includes a notification management unit 204, a customer information management unit 205, an apparatus information management unit 206, and a sales company information management unit 208. In the present exemplary embodiment, the notification management unit 204, the customer information management unit 205, the apparatus information management unit 206, a vendor determination unit 207, and the sales company information management unit 208 are configured as a module. The control unit 203 manages necessary information for monitoring and maintaining the image forming apparatus 102.

The notification management unit 204 specifies the contents and destination of a notification, and generates notification data. The notification includes a request to a service engineer who maintains the image forming apparatus 102, such as a maintenance request and a consumable supply request, for example, by electronic mail. The service engineer is provided with a cellular phone or personal digital assistance (PDA) as a data communication device having electronic mail reception functions to receive electronic mails from the management server 106 and confirm its contents.

The customer information management unit 205 manages information about customers where the image forming apparatus 102 and the monitoring apparatus 109 are installed. The sales company information management unit 208 manages information about sales companies which manage customers where the image forming apparatus 102 and the monitoring apparatus 109 are installed.

The apparatus information management unit 206 manages various pieces of information about the image forming apparatuses 102 under maintenance and management. The apparatus information management unit 206 manages, for example, identification information, failure state information, maintenance history, administrator information, and consumable management information of the image forming apparatus 102.

A manufacturer determination unit (vendor determination unit) 207 included in the apparatus information management unit 206 specifies and manages a manufacturer (vendor) of the image forming apparatus 102 based on a MAC address received together with its operation information. A vendor may be specified with other than the MAC address. The MAC address of Ethernet is composed of 48 bits. The first three bytes (24 bits) of the MAC address are assigned a network apparatus vendor code (a code that uniquely identifies a manufacturer) managed by the IEEE. The remaining three bytes (24 bits) are assigned a product number specific to each individual product by respective network apparatus vendors. Since only one unique MAC address is assigned to each individual product in the world, it is guaranteed that every product is assigned a different MAC address.

Figure 3:
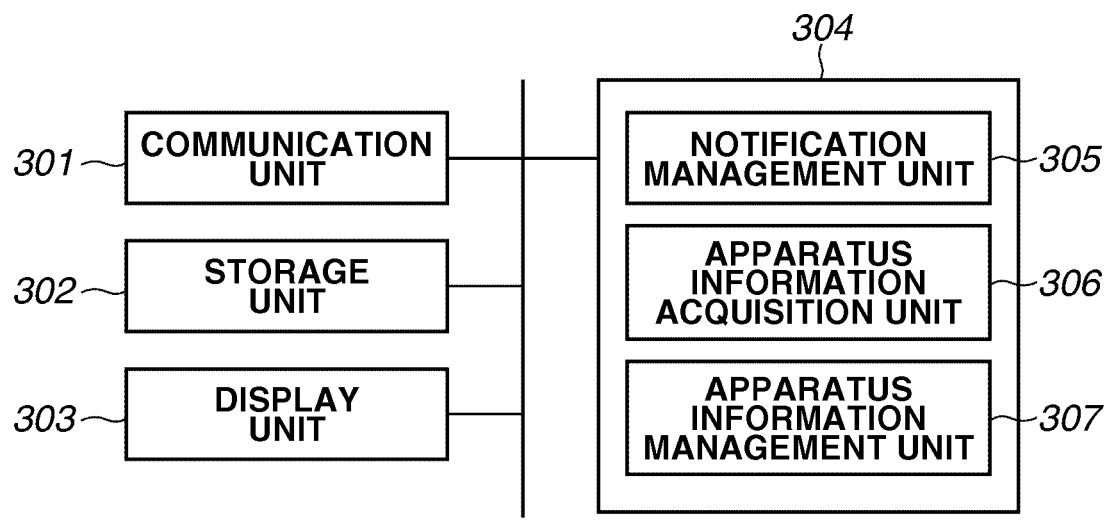
FIG. 3 is a block diagram of a configuration of a monitoring apparatus illustrated in FIG. 1.

FIG. 3 is a block diagram of the configuration of the monitoring apparatus 109 illustrated in FIG. 1. Referring to FIG. 3, the monitoring apparatus 109 includes a communication unit 301, a storage unit 302, a display unit 303, and a control unit 304. The communication unit 301 communicates with the management server 106 and the image forming apparatus 102. The communication unit 301 transmits the operation information acquired from the image forming apparatus 102 to the management server 106. The communication unit 301 also receives a command from the management server 106.

The operation information acquired from the image forming apparatus 102, monitoring setup information of the image forming apparatus 102, and information about the management server are registered in the storage unit 302. Information that can or cannot be acquired from the monitoring apparatus 109 by the image forming apparatus 102 differs for each model thereof. Such information includes firmware version information of the image forming apparatus 102 and browser information referenced from a panel of the image forming apparatus 102. The above-mentioned monitoring setup specifies whether such information is to be acquired from the monitoring apparatus 109. The display unit 303 displays operation information currently being monitored and a monitoring setup screen. The control unit 304 includes a notification management unit 305, an apparatus information acquisition unit 306, and an apparatus information management unit 307.

The notification management unit 305 specifies a destination of notification, such as the management server 106, and generates and manages notification data. The apparatus information acquisition unit 306 acquires operation information from the image forming apparatus 102. In the present exemplary embodiment, the IP address and MAC address of the image forming apparatus 102 are registered in the storage unit 302 together with its operation information in an associated way. The apparatus information management unit 307 generates and manages information for the management server 106 based on the acquired operation information.

The present exemplary embodiment of the present invention can be attained even if functions of the monitoring apparatus 109 are implemented in the image forming apparatus 102. In that case, a memory area and a communication unit in the image forming apparatus 102 may be shared.

FIG. 4 is an exemplary operation information table of image forming apparatuses 102 under management. The operation information table is used by the apparatus information management unit 206 of the management server 106 illustrated in FIG. 1. The operation information table is stored in the storage unit 202 of the management server 106.

Referring to FIG. 4, the operation information table includes a customer ID 401 which denotes a customer where each image forming apparatus is installed. The customer ID 401 is managed also by the customer information management unit 205 of the management server 106. The operation information table also includes a S/N 402 which denotes the serial number of image forming apparatuses 102 registered in the management server 106. The serial number means, for example, a unique product number used to identify each individual product set by respective image forming apparatus vendors (manufactures).

The operation information table also includes an IP address 403 and MAC address 404 of image forming apparatuses 102. The MAC address is used, for example, to identify an image forming apparatus vendor in step S602 of the flow chart illustrated in FIG. 6B. The operation information table also includes counter information 405 included in the operation information of image forming apparatuses 102. The value of the counter information 405 is used to manage accounting and grasp the operation status of the image forming apparatus 102. The operation information table also includes vendor information 406 which denotes each image forming apparatus vendor, and a result of the determination of vendor by the management server 106 based on the information transmitted from the monitoring apparatus 109. In addition to the customer ID 401, the S/N 402, the IP address 403, the MAC address 404, the counter information 405, and the vendor 406 of FIG. 4, other information can be stored in the operation information table. For example, all pieces of information including operation information such as the counter information received from the monitoring apparatus 109 can be stored in the operation information table. With the operation information table illustrated in FIG. 4, the third and fifth image forming apparatuses 102 from different vendors are assigned the same S/N.

Figure 6A:
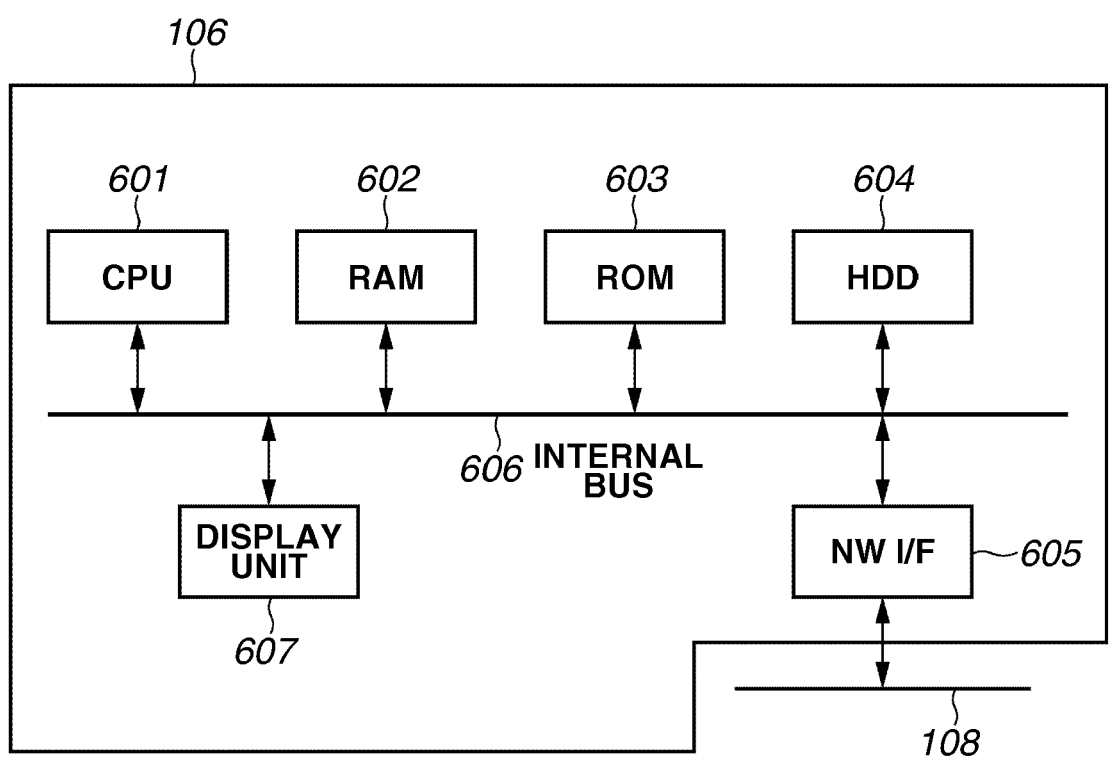
FIG. 6A is a block diagram of a hardware configuration of the management server.

FIG. 5 is an exemplary table retained by the management server 106 illustrated in FIG. 1, illustrating a relation between the MAC address and vendor. Referring to FIG. 5, the exemplary operation information table includes a MAC address 501 and a vendor name 502 of each image forming apparatus. FIG. 6A is a block diagram of a hardware configuration of the management server 106 illustrated in FIG. 1. Referring to FIG. 6A, a read-only memory (ROM) 603 stores a program (including a program which attains each piece of processing of FIG. 6B) executed by a central processing unit (CPU) 601. The CPU 601 totally controls each device connected thereto via an internal bus 606. The CPU 601, a random access memory (RAM) 602, the ROM 603, a hard disk drive (HDD) 604, a network interface (NW I/F) 605, and a display unit 607 are connected to the internal bus 606.

The network interface 605, corresponding to the communication unit 201 illustrated in FIG. 2, bi-directionally exchanges data with external network apparatuses and personal computers (PCs) via the Internet 108 illustrated in FIG. 1.

The HDD 604, corresponding to the storage unit 202 illustrated in FIG. 2, serves as an external storage. The HDD 604 stores registration information of the image forming apparatus 102, and also can store the above-mentioned counter information, system information, and status information instead of the RAM 602 serving as a backup memory.

The CPU 601 is configured such that image data can be stored in the HDD 604. An operating system (OS) is installed in the HDD 604. After being loaded from the HDD 604 into the RAM 602, the OS manages various pieces of data and execution of applications. The CPU 601 loads an application program from the HDD 604 into the RAM 602 and then executes it to perform data communication processing, data calculation processing, and data display processing.

Figure 6B:
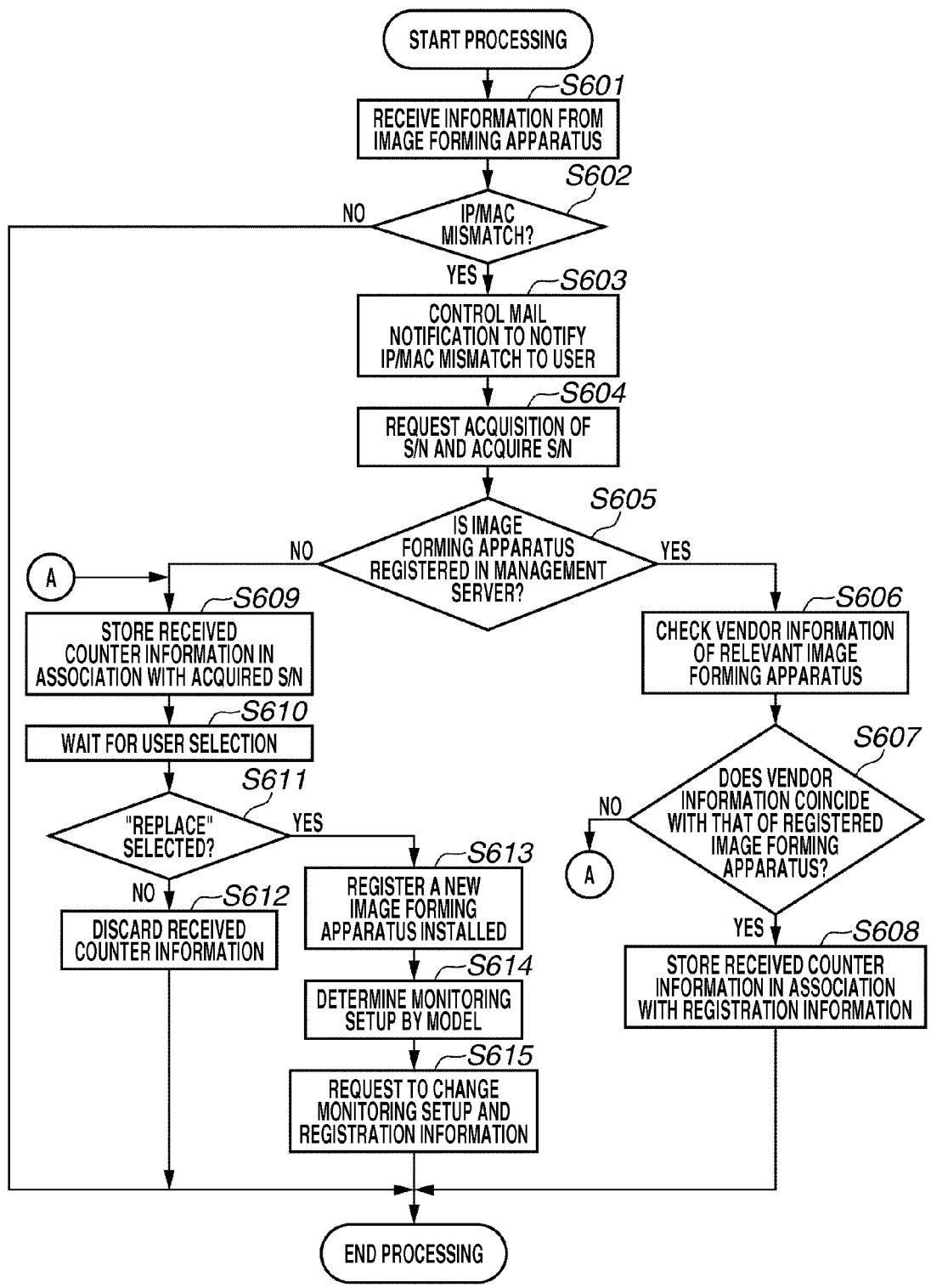
FIG. 6B is a flow chart of exemplary data processing performed by the management server according to a first exemplary embodiment of the present invention.

The thus-configured management server 106 performs the following data monitoring processing. FIG. 6B is a flow chart of exemplary data processing performed by the management server 106 according to the present exemplary embodiment. In the present exemplary embodiment, the management server 106 illustrated in FIG. 1 recognizes a change in network setup and determines a method for storing the operation information received from the monitoring apparatus 109. Each step is attained when the CPU 601 of the management server 106 illustrated in FIG. 6A loads a relevant control program from the HDD 604 into the RAM 602 and then executes it. The control program includes the modules 204 to 208 illustrated in FIG. 2.

In step S601, the CPU 601 receives information including the operation information such as the counter information transmitted from the monitoring apparatus 109 illustrated in FIG. 1 via the NW I/F 605. In step S602, the CPU 601 compares the identification information of the image forming apparatus 102, from which the operation information included in the received information was acquired, with the identification information in the operation information table (FIG. 4) of image forming apparatuses 102 under management registered in the HDD 604 of the management server 106 to determine whether the two pieces of information coincide with each other. The identification information to be compared with is a combination of the IP address and MAC address of each image forming apparatus 102. The above processing is performed to detect a change in the IP address of an image forming apparatus 102 connected to the network, and detect that a new image forming apparatus has been connected thereto.

When the CPU 601 determines that the identification information included in the received information coincides with registration information of the management server 106 as a result of the comparison in step S602 (YES in the same step), the CPU 601 stores the received operation information in the HDD 604 (operation information table of FIG. 4) in connection with the registration information. Then, the CPU 601 terminates the processing of FIG. 6B.

When the CPU 601 determines that the identification information included in the received information does not coincide with registration information of the management server 106 in step S602 (NO in the same step), the CPU 601 advances processing to step S603. In step S603, the CPU 601 notifies IP/MAC mismatch to a specific user (such as a service engineer) by electronic mail. FIG. 7 illustrates an exemplary e-mail notifying IP/MAC mismatch. Further, the CPU 601 stops notification of other mails. Other mails include, for example, a notification of counter reversal and an event notification (jam, service call, and alarm). The sales company information management unit 208 of the management server 106 manages the mail address of notification destination service engineers based on the service engineer code.

The following cases are assumed for IP/MAC mismatch. One case of IP/MAC mismatch is when the IP address and MAC address included in the information received in step S601 are missing in the registration information. Another case of IP/MAC mismatch is when, although the IP address included in the information received in step S601 is present in the registration information, the MAC address corresponding to the IP address is different from the MAC address in the registration information. Still another case of IP/MAC mismatch is when, although the MAC address included in the information received in step S601 is present in the registration information, the IP address corresponding to the MAC address is different from the IP address in the registration information.

In step S604, the CPU 601 requests the monitoring apparatus 109 for an S/N of an image forming apparatus under IP/MAC mismatch. Then, the CPU 601 acquires an S/N of the image forming apparatus 102 under IP/MAC mismatch from the monitoring apparatus 109 via the Internet 108.

In step S605, the CPU 601 determines whether the image forming apparatus 102 is registered in the management server 106 based on the S/N acquired from the monitoring apparatus 109. When the CPU 601 determines that the S/N of the image forming apparatus 102 acquired in step S604 is registered in the operation information table (FIG. 4) in the management server 106 in step S605 (YES in the same step), the CPU 601 advances processing to step S606.

In step S606, the CPU 601 checks the vendor information of the image forming apparatus 102 based on the vendor code of the MAC address included in the received information. Then, the CPU 601 of the management server 106 stores the S/N and the vendor information 406 in an associated way in the operation information table illustrated in FIG. 4.

In step S607, the CPU 601 determines whether the vendor information 406 stored in the operation information table in the management server 106 illustrated in FIG. 4 coincides with the vendor information checked in step S606. In other words, the CPU 601 determines whether the image forming apparatus 102, from which the operation information was acquired, coincides with an image forming apparatus registered in the management server 106.

When the CPU 601 determines that the stored vendor information coincides with the checked vendor information in step S607 (YES in the same step), the CPU 601 advances processing to step S608. In step S608, the CPU 601 stores the operation information received from the monitoring apparatus 109 in the HDD 604 (operation information table of FIG. 4) in connection with the registration information of the management server 106. Then, the CPU 601 terminates the processing of FIG. 6B. The above processing is performed, for example, when a network card (NIC) of the image forming apparatus 102 is replaced. In step S608, the CPU 601 also updates the registration information determined to be mismatched in step S602 (IP address or MAC address) in the operation information table. When the CPU 601 determines that the stored vendor information coincides with the checked vendor information in step S607 (NO in the same step), the CPU 601 advances processing to step S609.

Also when the CPU 601 determines that the S/N of the image forming apparatus 102 acquired in step S604 is not registered in the operation information table in the management server 106 in step S605 (NO in the same step), the CPU 601 advances processing to step S609. In step S609, the CPU 601 stores the operation information received from the monitoring apparatus 109 in a work area of the HDD 604 in association with the S/N acquired in step S604. Although the operation information is temporarily stored in the work area in step S609 in the following cases, the CPU 601, in any case, temporarily stores information of an unregistered image forming apparatus under management.

The CPU 601 determines NO in step S607 and advances processing to step S609, for example, when the S/N of an installed image forming apparatus coincides with that of an image forming apparatus registered in the management server 106 but the vendor information is different between the two image forming apparatuses. The CPU 601 determines NO in step S605 and advances processing to step S609, for example, when a new image forming apparatus is installed on the network.

Figure 8:
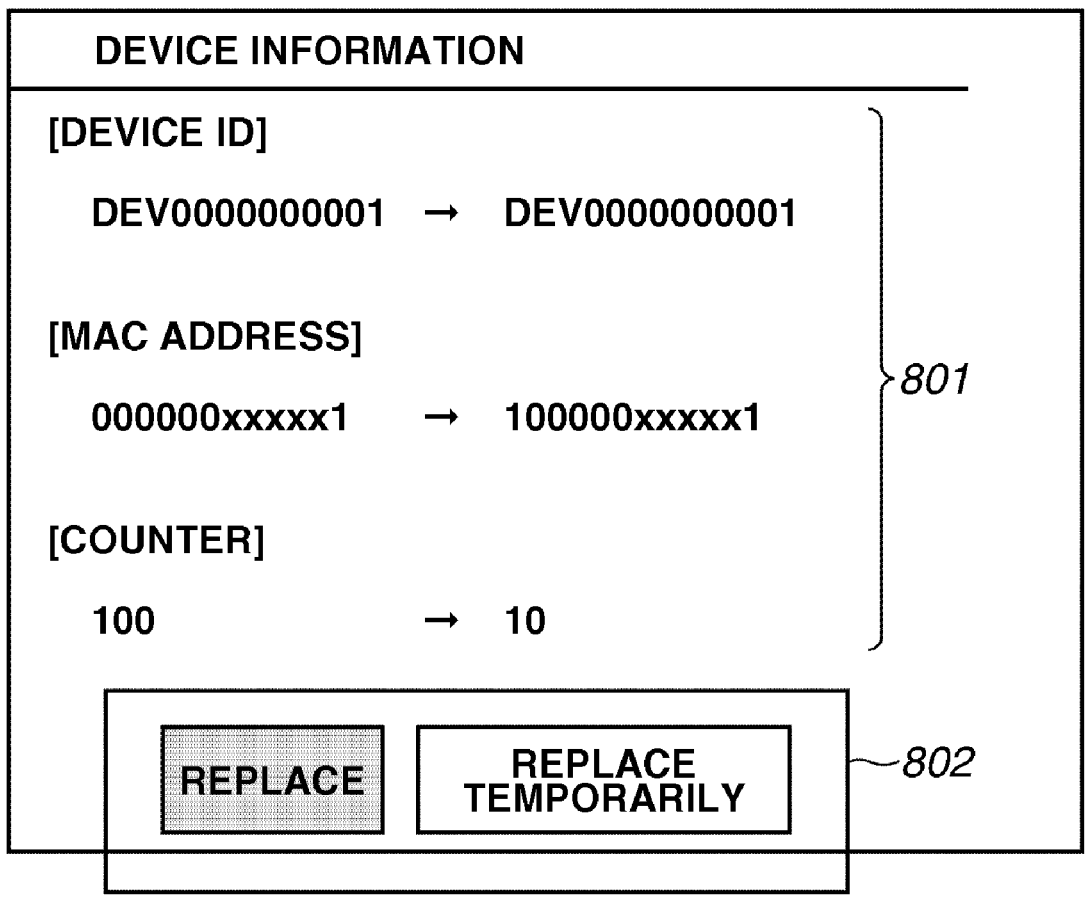
FIG. 8 illustrates an exemplary web page created by the management server illustrated in FIG. 1.

The mail sent to a specific user (service engineer) in step S603 for notifying IP/MAC mismatch (FIG. 7) includes a link to a web page created by the management server 106. For example, the service engineer traces the link to make predetermined selection regarding installation conditions of the image forming apparatus 102. The service engineer can select either "Replace" to install a new image forming apparatus or "Replace temporarily" for incorrect or tentative installation. FIG. 8 illustrates an exemplary web page. In step S610, the CPU 601 waits until the service engineer selects either of the above-mentioned items by using a mobile data communication device. In step S611, upon reception of a selection from the service engineer, the CPU 601 determines whether the selection is "Replace" of the image forming apparatus 102. When the CPU 601 determines that the selection by the service engineer is "Replace" of the image forming apparatus 102 in step S611 (YES in the same step), the CPU 601 assumes installation of a new image forming apparatus and then advances processing to step S613.

In step S613, the CPU 601 registers the new image forming apparatus installed in the operation information table (FIG. 4) in the management server 106. The CPU 601 performs this registration processing based on the information temporarily stored in the work area in step S609. Suppose that the monitoring apparatus 109 is registered in the HDD 604 of the management server 106, and that the upper-limit number of monitorable image forming apparatuses 102 have already been registered in the operation information table in connection with the monitoring apparatus 109.

Also in this case, the management server 106 temporarily registers the new image forming apparatus in the operation information table. When registering a new image forming apparatus, various pieces of identification information of the apparatus acquired when the operation information was received are also associated with the apparatus. The above-mentioned temporary registration processing is performed to smoothly perform management processing since it is assumed that, at the time of replacement of an image forming apparatus 102, the former image forming apparatus 102 under monitoring may not be monitored.

In step S614, the CPU 601 determines appropriate monitoring setup based on the model information of the new image forming apparatus 102 registered. Specifically, the CPU 601 determines the type of operation information to be acquired, and schedule of information acquisition. In step S615, the CPU 601 transmits a request to change the appropriate monitoring setup of the image forming apparatus 102 determined in step S614 and a request to change the registration information (S/N, IP address, and MAC address) thereof to the monitoring apparatus 109. Then, the CPU 601 terminates the processing of FIG. 6B.

When the CPU 601 determines that the selection by the service engineer is "Replace temporarily" in step S611 (NO in the same step), the CPU 601 advances processing to step S612. In step S612, the CPU 601 discards from the HDD 604 the operation information received from the monitoring apparatus 109 in step S601 and temporarily stored in the HDD 604 in step S609. Then, the CPU 601 terminates the processing of FIG. 6B.

FIG. 7 illustrates an exemplary e-mail sent from the management server 106 illustrated in FIG. 1 to a user (a service engineer) for notifying IP/MAC mismatch in step S603 of FIG. 6B. The service engineer is provided with a mobile terminal to receive electronic mails sent from the management server 106. The mobile terminal may be a cellular phone or PDA as a mobile data communication device.

Referring to FIG. 7, a mail portion 701 includes a subject and body text of a mail notifying IP/MAC mismatch. A line 702 denotes a link to a web page created by the management server 106. FIG. 8 illustrates an exemplary web page created by the management server 106 illustrated in FIG. 1. This web page is created based on the information about the image forming apparatus 102 under IP/MAC mismatch, and the registration information of the management server 106.

A page portion 801 denotes the registration information of the management server 106, and the information about the image forming apparatus 102 under IP/MAC mismatch. By checking this information on the screen of the data communication device, the service engineer can recognize the registration information of the management server 106 as well as the information about an image forming apparatus currently installed at a customer. A page portion 802 denotes buttons for selecting a cause of IP/MAC mismatch. With this screen, the service engineer confirms installation of a new apparatus, incorrect installation, tentative installation, and other statuses based on on-site information, and presses either the "Replace" or "Replace temporarily" button. The management server 106 determines the button selection instep S611 of FIG. 6B.

Figure 9:
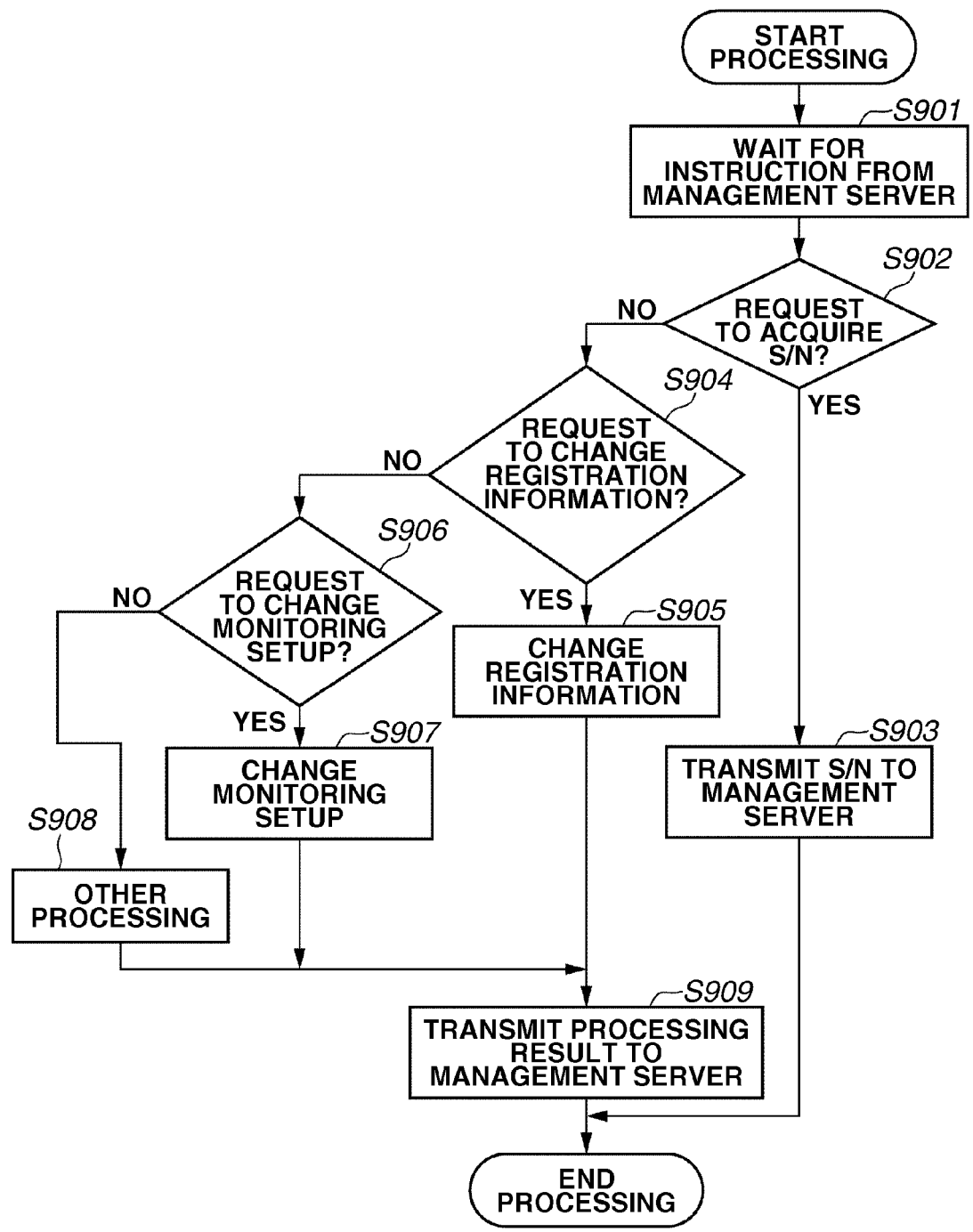
FIG. 9 is a flow chart of exemplary data processing performed by a monitoring apparatus according to the first exemplary embodiment.

FIG. 9 is a flow chart of exemplary data processing performed by the monitoring apparatus 109 according to the present exemplary embodiment. The monitoring apparatus 109 performs this processing, for example, to set registration information and monitoring information of the image forming apparatus 102 under monitoring according to setup information acquired from the management server 106. The hardware configuration of the monitoring apparatus 109 is similar to that of the management server 106 illustrated in FIG. 6A. Further, the monitoring apparatus 109 attains this processing when the control unit 304 included therein loads a control program relevant to each step from the ROM 603 and HDD 604 into the RAM 602 and then executes it. The control program includes the modules 305 to 307 illustrated in FIG. 3.

In step S901, the communication unit 301 waits for a command from the management server 106 via the Internet 108 and the LAN 101. When the communication unit 301 receives a command from the management server 106, the control unit 304 advances processing to step S902. In step S902, the control unit 304 determines whether the command from the management server 106 is a request to acquire an S/N of the image forming apparatus 102. When the control unit 304 determines that the command is a request to acquire an S/N of the image forming apparatus 102 in steps S902 (YES in the same step), the control unit 304 advances processing to step S903. In step S903, the apparatus information management unit 307 transmits the S/N of the image forming apparatus 102 to the management server 106 via the communication unit 301. Then, the control unit 304 terminates the processing of FIG. 9. When the control unit 304 determines that the command from the management server 106 is not a request to acquire an S/N of the image forming apparatus 102 in step S902 (NO in the same step), the control unit 304 advances processing to step S904. In step S904, the control unit 304 determines whether the command from the management server 106 is a request to change the registration information of the image forming apparatus 102.

When the control unit 304 determines that the command is a request to change the registration information of the image forming apparatus 102 in step S904 (YES in the same step), the control unit 304 advances processing to step S905. In step S905, the apparatus information management unit 307 changes the registration information following the above-mentioned command (change request) from the management server 106. In step S909, the control unit 304 transmits a result of the processing to the management server 106 via the communication unit 301 to notify that the processing to change the registration information is completed. Then, the control unit 304 terminates the processing of FIG. 9.

When the control unit 304 determines that the command is not a request to change the registration information of the image forming apparatus 102 in step S904 (NO in the same step), the control unit 304 advances processing to step S906. Instep S906, the control unit 304 determines whether the command is a request to change the monitoring setup. When the control unit 304 determines that the command is a request to change the monitoring setup in step S906 (YES in the same step), the control unit 304 advances processing to step S907. In step S907, the apparatus information acquisition unit 306 changes the monitoring setup for the image forming apparatus 102 following the above-mentioned command (change request) from the management server 106. In step S909, the control unit 304 transmits a result of the processing to the management server 106 to notify that the processing to change the registration information is completed. Then, the control unit 304 terminates the processing of FIG. 9.

When the control unit 304 determines that the command is not a request to change the monitoring setup in step S906 (NO in the same step), the control unit 304 advances processing to step S908 to perform other processing. In step S909, the control unit 304 transmits a result of the processing to the management server 106. Then, the control unit 304 terminates the processing of FIG. 9.

While the present exemplary embodiment has specifically been described based on the configuration of the image forming apparatus 102, the control mechanism, the information tables, and the processing performed by the management server 106 and the image forming apparatus 102 when IP/MAC mismatch occurs, the present exemplary embodiment is not limited thereto.

When the management server recognizes IP/MAC mismatch (IP/MAC is one of network setups), the present exemplary embodiment allows the management server to change the method for storing operation information to perform correct calculation, thus preventing improper charge to customers. The present exemplary embodiment also allows the management server to automatically recognize replacement of a NIC board in the same image forming apparatus 102, and to automatically change registration information and appropriately make monitoring setup to the monitoring apparatus following a selection made by the service engineer in response to a notification. Therefore, the present exemplary embodiment makes it possible to configure a management system for appropriately managing operation information of the image forming apparatus 102 while performing processing for matching registration information without imposing a burden on the service engineer.

According to a second exemplary embodiment of the present invention, the monitoring apparatus 109 performs data processing of the management server 106 described in the above-mentioned first exemplary embodiment, and, based on a result of the data processing, determines a method for storing the operation information received by the management server 106. In the present exemplary embodiment, a device ID is added to each image forming apparatus 102. Although not illustrated, the device ID is included in the operation information table of the present exemplary embodiment. Specifically, the management server 106 of the present exemplary embodiment manages the operating state of the image forming apparatus 102 based on the operation information table including various pieces of operation information (customer ID, device ID, serial number, IP address, MAC address, and counter information) and the vendor information.

Figure 10:
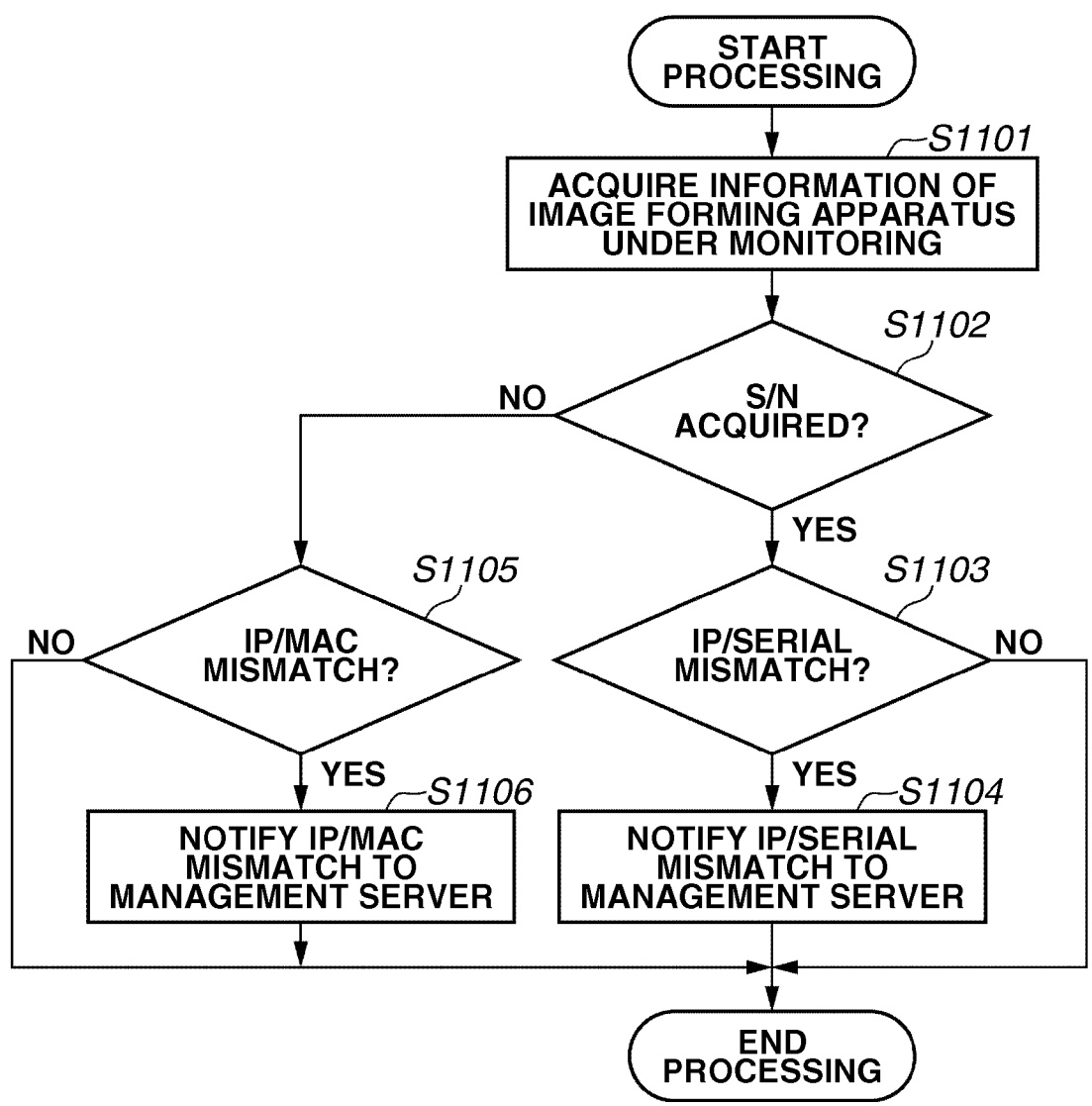
FIG. 10 is a flow chart of exemplary data processing performed by a monitoring apparatus according to a second exemplary embodiment of the present invention.

FIG. 10 is a flow chart of exemplary data processing performed by the monitoring apparatus 109 according to the second exemplary embodiment. The hardware configuration of the monitoring apparatus 109 is similar to that of the management server 106 illustrated in FIG. 6A. Further, this processing is attained when the control unit 304 included therein loads a control program relevant to each step from the ROM 603 and HDD 604 into the RAM 602 and then executes it. The control program includes the modules 305 to 307 illustrated in FIG. 3.

In step S1101, the control unit 304 of the monitoring apparatus 109 acquires operation information such as counter value and log and failure information such as hardware failure and jam repetition from the image forming apparatus 102 under monitoring. The control unit 304 acquires these pieces of information, for example, during a communication test for checking communication between the monitoring apparatus 109 and the image forming apparatus 102 under monitoring, when the counter value is acquired from the image forming apparatus 102 under monitoring, or when the registration information of the image forming apparatus 102 under monitoring is changed in the monitoring apparatus 109. In step S1102, the control unit 304 checks whether the S/N (serial number) of the image forming apparatus 102 is included in the information acquired in step S1101. The S/N is not included in the acquired information, for example, in the case of a model of the image forming apparatus 102 which transmits information without including the S/N.

When the control unit 304 determines that the S/N is included in the acquired information as a result of the check in step S1102 (YES in the same step), the control unit 304 advances processing to step S1103. In step S1103, the control unit 304 compares the information of the image forming apparatus 102 registered in the storage unit 202 with the information acquired in step S1101. Specifically, the control unit 304 compares a combination of the IP address and the S/N. When the control unit 304 determines that the registration information does not coincide with the acquired information (IP/Serial mismatch) as a result of the comparison in step S1103 (YES in the same step), the control unit 304 advances processing to step S1104. In step S1104, the control unit 304 notifies the information difference as "IP/Serial mismatch" together with the customer ID to the management server 106 (first notification). When the control unit 304 determines that the registration information coincides with the acquired information (IP/Serial match) as a result of the comparison in step S1103 (NO in the same step), the control unit 304 terminates the processing of FIG. 10.

When the control unit 304 determines that the S/N is not included in the acquired information as a result of the check in step S1102 (NO in the same step), the control unit 304 advances processing to step S1105. In step S1105, the control unit 304 compares the information about the image forming apparatus 102 registered in the monitoring apparatus 109 with the acquired information. Specifically, the control unit 304 compares a combination of the IP address and the MAC address. When the control unit 304 determines that the registration information does not coincide with the acquired information (IP/MAC mismatch) as a result of the comparison in step S1105 (YES in the same step), the control unit 304 advances processing to step S1106. In step S1106, the control unit 304 notifies the information difference as "IP/MAC mismatch" together with the customer ID to the management server 106 (second notification). When the control unit 304 determines that the registration information coincides with the acquired information (IP/MAC match) as a result of the comparison in step S1105 (NO in the same step), the control unit 304 terminates the processing of FIG. 10.

Figure 11:
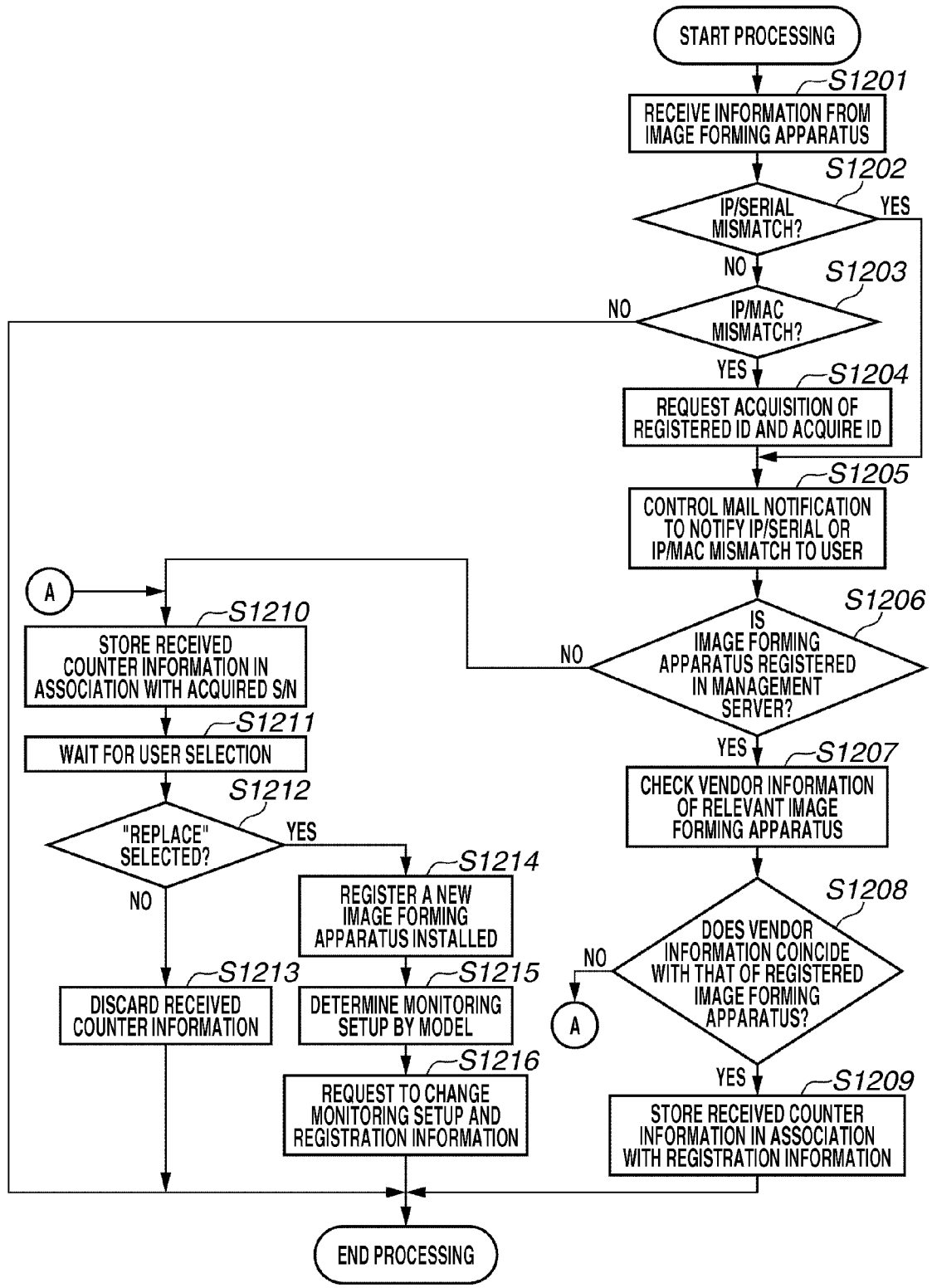
FIG. 11 is a flow chart of exemplary data processing performed by a management server according to the second exemplary embodiment.

FIG. 11 is a flow chart of exemplary data processing performed by the management server 106 according to the second exemplary embodiment. Each step is attained when the CPU 601 of the management server 106 illustrated in FIG. 6A loads a relevant control program from the HDD 604 into the RAM 602 and then executes it. The control program includes the modules 204 to 208 illustrated in FIG. 2. In step S1201, the CPU 601 receives apparatus information such as the counter value transmitted from the monitoring apparatus 109. In step S1202, the CPU 601 determines whether the apparatus information received in step S1201 is a notification of "IP/Serial mismatch."

When the CPU 601 determines that the received information is a notification of "IP/Serial mismatch" as a result of the determination in step S1202 (YES in the same step), the CPU 601 advances processing to step S1205. When the CPU 601 determines that the received information is not a notification of "IP/Serial mismatch" as a result of the determination in step S1202 (NO in the same step), the CPU 601 advances processing to step S1203. In step S1203, the CPU 601 determines whether the received information is a notification of "IP/MAC mismatch." When the CPU 601 determines that the received information is not a notification of "IP/MAC mismatch" as a result of the determination in step S1203 (NO in the same step), the CPU 601 terminates the processing of FIG. 11.

When the CPU 601 determines that the received information is a notification of "IP/MAC mismatch" as a result of the determination in step S1203 (YES in the same step), the CPU 601 advances processing to step S1204. In step S1204, the CPU 601 requests the monitoring apparatus 109 for the registration information of the image forming apparatus 102 under IP/MAC mismatch. Then the CPU 601 acquires registration information of the image forming apparatus 102 under IP/MAC mismatch from the monitoring apparatus 109 via the Internet 108 and then advances processing to step S1205. The registration information means the device ID of the image forming apparatus 102 registered in the monitoring apparatus 109. Normally, this device ID coincides with that registered in the operation information table in the management server 106.

In step S1205, the CPU 601 notifies IP/Serial mismatch to the service engineer by electronic mail. Further, the CPU 601 stops notification of other mails. Other mails include, for example, a notification of counter reversal and an event notification (jam, service call, and alarm). The sales company information management unit 208 of the management server 106 manages the mail address of notification destination service engineers based on the service engineer code.

In step S1206, the CPU 601 determines whether the image forming apparatus 102 is registered in the operation information table in the management server 106 based on the S/N or device ID used for determination processing. When the CPU 601 determines that the image forming apparatus 102 corresponding to the S/N or device ID used for determination processing is registered in the management server 106 in step S1206 (YES in the same step), the CPU 601 advances processing to step S1207. When the CPU 601 determines that the image forming apparatus 102 corresponding to the S/N or device ID used for determination processing is not registered in the management server 106 in step S1206 (NO in the same step), the CPU 601 advances processing to step S1210. Since steps S1207 to S1216 respectively perform similar processing to steps S606 to S615 of FIG. 6B described in the first exemplary embodiment, descriptions of steps S1207 to S1216 are omitted.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2009-020151 filed Jan. 30, 2009 and No. 2009-242486 filed Oct. 21, 2009, which are hereby incorporated by reference herein in their entirety.

What is claimed is:

1. A management server for managing a plurality of image forming apparatuses connected to a network, the management server comprising:
   a storage unit;
   a management unit configured to manage an IP address, MAC address, and product number of an image forming apparatus under management, stored in the storage unit in an associated way, as registration information thereof;
   an acquisition unit configured to acquire an IP address, MAC address, and product number of an image forming apparatus together with operation information thereof via the network;
   a determination unit configured to determine, when the IP address and MAC address acquired by the acquisition unit are not registered in an associated way in the registration information managed by the management unit, whether the product number acquired by the acquisition unit is registered in the registration information managed by the management unit; and
   a storing unit configured to store, when the determination unit determines that the product number acquired by the acquisition unit is registered in the registration information managed by the management unit, the operation information acquired by the acquisition unit in the storage unit in association with an image forming apparatus specified by the registration information including the product number.

2. The management server according to claim 1, wherein, when the determination unit determines that the product number acquired by the acquisition unit is not registered in the registration information managed by the management unit, the storing unit stores the operation information acquired by the acquisition unit in the storage unit in association with the product number acquired by the acquisition unit as an unregistered image forming apparatus under management.

3. The management server according to claim 1, wherein the management unit manages an IP address, MAC address, product number, and vendor information of the image forming apparatus under management in an associated way as registration information thereof,
   wherein the acquisition unit acquires the IP address, MAC address, product number, and vendor information of the image forming apparatus together with operation information thereof via the network,
   wherein the management server further comprises a confirmation unit configured to confirm, when the determination unit determines that the product number acquired by the acquisition unit is registered in the registration information managed by the management unit, whether the vendor information registered in the registration information in association with the product number coincides with the vendor information acquired by the acquisition unit, and
   wherein, when the confirmation unit confirms that the registered vendor information coincides with the acquired vendor information, the storing unit stores the operation information acquired by the acquisition unit in the storage unit in association with an image forming apparatus specified by the registration information including the product number and vendor information acquired by the acquisition unit.

4. The management server according to claim 3, wherein, when the confirmation unit confirms that the registered vendor information does not coincide with the acquired vendor information, the storing unit stores the operation information acquired by the acquisition unit in the storage unit in association with the product number acquired by the acquisition unit as an unregistered image forming apparatus under management.

5. The management server according to claim 1, further comprising a notification unit configured to send, when the IP address and MAC address acquired by the acquisition unit are not registered in an associated way in the registration information managed by the management unit, a notification including information for confirming installation conditions of the image forming apparatus from which the IP and MAC addresses were acquired.

6. The management server according to claim 3, wherein the management unit changes the registration information by using the information acquired by the acquisition unit, based on at least one of the result of the determination by the determination unit and the result of the confirmation by the confirmation unit.

7. A method for managing, in a management system, a plurality of image forming apparatuses connected to a network, the method comprising:
   managing an IP address, MAC address, and product number of an image forming apparatus under management in an associated way as registration information thereof;
   acquiring an IP address, MAC address, and product number of an image forming apparatus together with operation information thereof via the network;
   determining, when the acquired IP address and MAC address are not registered in an associated way in the registration information, whether the acquired product number is registered in the registration information; and
   storing, when the acquired product number is determined to be registered in the registration information, the acquired operation information in association with an image forming apparatus specified by the registration information including the product number.

8. The method according to claim 7, further comprising:
   managing the IP address, MAC address, product number, and vendor information of the image forming apparatus under management in an associated way as registration information thereof;
   acquiring the IP address, MAC address, product number, and vendor information of the image forming apparatus together with operation information thereof via the network;
   confirming, when the acquired product number is determined to be registered in the registration information, whether the vendor information registered in the registration information in association with the product number coincides with the acquired vendor information; and
   storing, when the registered vendor information coincides with the acquired vendor information, the acquired operation information in association with an image forming apparatus specified by the registration information including the acquired product number and vendor information.

9. The method according to claim 8, further comprising changing the registration information by using the acquired information, based on at least one of the result of the determination whether the acquired product number is registered and the result of the confirmation whether the registered vendor information coincides with the acquired vendor information.

10. A monitoring apparatus connected with a management server via the Internet to monitor a plurality of image forming apparatuses, the monitoring apparatus comprising:
    a management unit configured to manage an IP address, MAC address, and product number of an image forming apparatus under monitoring in an associated way as registration information thereof;
    an acquisition unit configured to acquire information including operation information from an image forming apparatus;
    a determination unit configured to determine whether the product number of the image forming apparatus under monitoring is included in the information acquired by the acquisition unit;
    a first notification unit configured to notify, when the determination unit determines that the product number is included in the acquired information, IP address and product number mismatch between acquired and registration information to the management server based on a fact that the IP address and product number included in the information acquired by the acquisition unit are not registered in an associated way in the registration information managed by the management unit; and
    a second notification unit configured to notify, when the determination unit determines that the product number is not included in the acquired information, IP address and MAC address mismatch between acquired and registration information to the management server based on a fact that the IP address and MAC address included in the information acquired by the acquisition unit are not registered in an associated way in the registration information managed by the management unit.

11. A method for controlling a monitoring apparatus connected with a management server via the Internet, wherein the monitoring apparatus monitors a plurality of image forming apparatuses by managing an IP address, MAC address, and product number of an image forming apparatus under monitoring in an associated way as registration information thereof by using a management unit, the method comprising:
    acquiring information including operation information from an image forming apparatus;
    determining whether the product number of the image forming apparatus under monitoring is included in the acquired information;
    notifying, when the product number is determined to be included in the acquired information, IP address and product number mismatch between acquired and registration information to the management server based on a fact that the IP address and product number included in the acquired information are not registered in an associated way in the registration information managed by the management unit; and
    notifying, when the product number is determined to be not included in the acquired information, IP address and MAC address mismatch between acquired and registration information to the management server based on a fact that the IP address and MAC address included in the acquired information are not registered in an associated way in the registration information managed by the management unit.

12. A computer-readable storage medium storing a computer program for causing a computer to perform a method for monitoring a plurality of image forming apparatuses, the method comprising:
    managing an IP address, MAC address, and product number of an image forming apparatus under monitoring in an associated way as registration information thereof;
    acquiring information including operation information from an image forming apparatus;
    determining whether the product number of the image forming apparatus under monitoring is included in the acquired information;
    notifying, when the product number is determined to be included in the acquired information, IP address and product number mismatch between acquired and registration information to the management server based on a fact that the IP address and product number included in the acquired information are not registered in an associated way in the managed registration information; and
notifying, when the product number is determined to be not included in the acquired information, IP address and MAC address mismatch between acquired and registration information to the management server connected via the Internet based on a fact that the IP address and MAC address included in the acquired information are not registered in an associated way in the managed registration information.

* * * * *